Sept. 13, 1932.   A. E. MANZER   1,876,995
ARMED MOTOR CYCLE
Filed Dec. 21, 1931
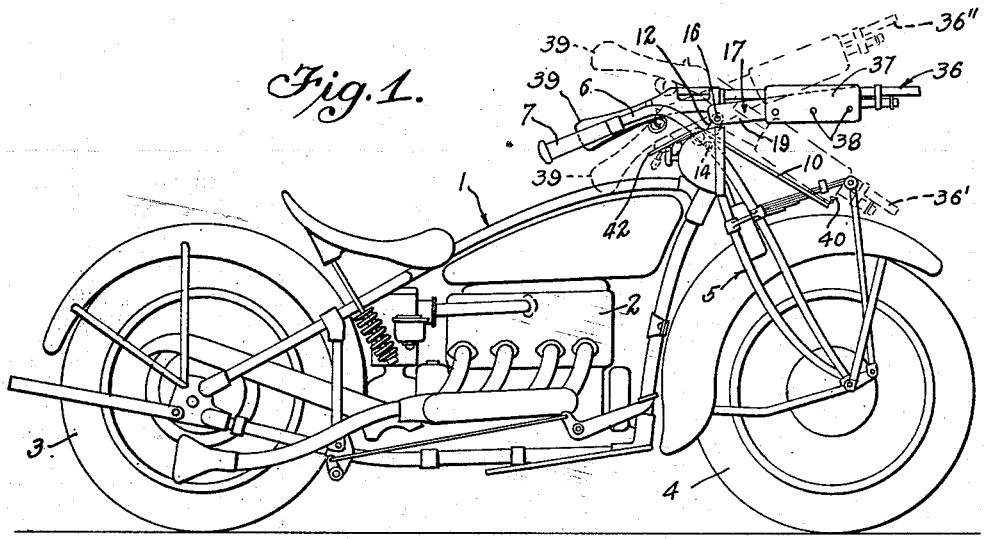
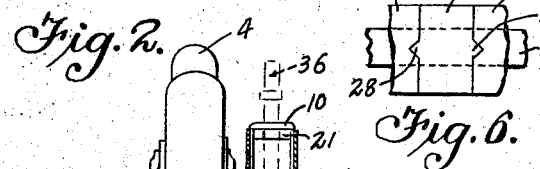
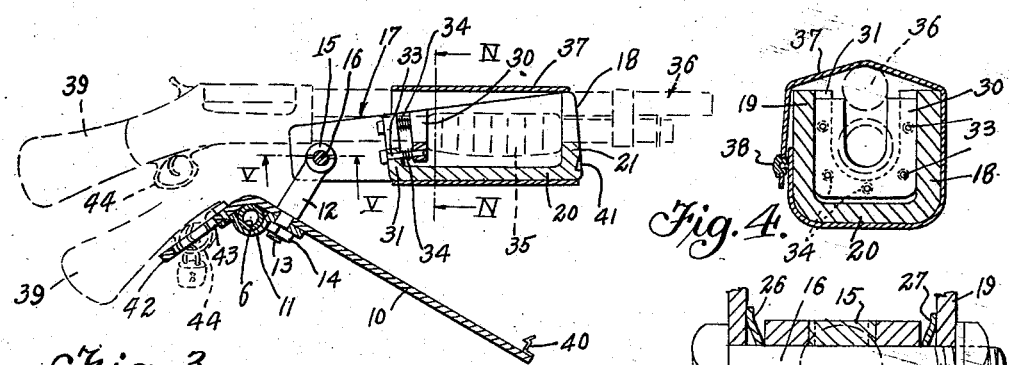
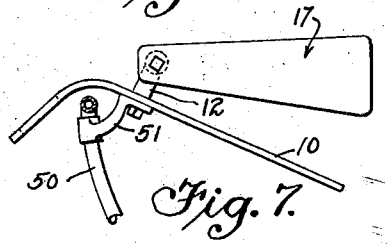
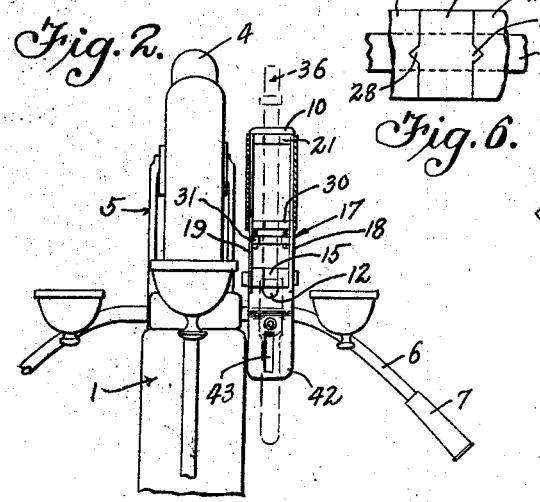
Inventor
Arthur E. Manzer
By Lyon & Lyon
Attorneys Patented Sept. 13, 1932

1,876,995

UNITED STATES PATENT OFFICE

ARTHUR E. MANZER, OF SAN GABRIEL, CALIFORNIA

ARMED MOTOR CYCLE

Application filed December 21, 1931. Serial No. 582,210.

This invention relates to a motorcycle provided with a gun mounting including a holder operably connected to the steering means of a motorcycle, whereby a suitable defensive weapon such as a rifle, shotgun or sub-machine gun may be carried in a readily available manner by the operator or rider of the motorcycle. A motorcycle thus equipped is particularly adapted for use by officers in the administrative branch of the Government such as, for example, state, county and municipal officers, thereby permitting their scope of activity and usefulness to be materially enlarged.

Heretofore, motorcycle detachments have been at a material disadvantage when opposing armed enemies. For example, a motorcycle officer of a municipality, in the exercise of his police powers, often encounters armed opposition from criminals surprised while perpetrating a felony or pursued from the scene of the felony. Ordinarily, motorcycle officers are merely armed with a hand weapon such as a revolver, whereas the criminals are usually equipped with suitable means of defense and a vehicle to facilitate their escape. It is extremely difficult for an officer to operate his motorcycle at high speed and at the same time attempt to use his side arm. The effective range of a revolver may be said to be limited to a distance of 25 yards whereas the shoulder arms generally employed by the criminal class, such as for example, sawed-off shotguns and sub-machine guns, have effective ranges of 300 yards and more.

It is an object of this invention to disclose and provide a means whereby a motorcycle is transformed into a very effective unit capable of coping on equal terms with a larger vehicle equipped with suitable weapons such as sawed-off shotguns, etc.

It is also an object of this invention to disclose and provide a simple and economical motorcycle construction including a gun mounting provided with a holder pivoted on a substantially horizontal axis so as to permit a shoulder arm to be carried by the motorcycle.

An object of this invention is to disclose and provide a motorcycle provided with a suitable mounting for a shoulder arm, said mounting maintaining the shoulder arm in operative position in a plane paralleling the longitudinal axis of the motorcycle, thus permitting the operator of the motorcycle to maintain an object in line with his weapon as long as the motorcycle is headed towards such object.

A still further object of this invention is to disclose and provide a mounting and gun holder operably connected to the fork of a motorcycle, said holder being pivoted on a horizontal axis and capable of releasably carrying a gun.

Another object of the invention is to disclose and provide a gun mounting carried by the handlebars and fork of a motorcycle, said gun mounting including a holder pivoted on a horizontal axis and provided with means for releasably receiving and holding a sawed-off shotgun, means for selectively holding the holder and gun in substantially horizontal position, and means for releasably locking the holder in inoperative position.

These and other objects, uses and advantages of this invention will become apparent to those skilled in the art from the following detailed description of a preferred form of the invention, it being understood that the specific embodiment of the invention shown in the appended drawing is merely illustrative of one form which the invention may assume.

In the drawing referred to in the description and appended hereto,—

Fig. 1 is a side elevation of a motorcycle provided with the means of this invention.

Fig. 2 is a plan view of the front portion of the motorcycle and gun mounting carried thereby.

Fig. 3 is an enlarged vertical section taken longitudinally through the gun mounting and holder shown in Figs. 1 and 2.

Fig. 4 is a transverse section taken along the plane 4—4 indicated in Fig. 3.

Fig. 5 is a horizontal section taken along the plane 5—5 indicated in Fig. 3.

Fig. 6 is an enlarged front elevation of a portion of the means illustrated in Figs. 3 and 5.

Fig. 7 is a side elevation of a modified form of holder of gun mounting.

The motorcycle shown in Fig. 1 is one of customary type including a body portion generally indicated by the numeral 1, said body portion bearing a motor 2 and a rear driving wheel 3. The front or steering wheel 4 is mounted in a fork generally indicated by the numeral 5, said fork being pivotally connected to the body 1 on a substantially vertical axis as is customary. Handlebars 6 provided with handles 7 are operably connected to the fork 5.

As shown in Figs. 2 and 3, the gun mounting is attached to the handlebar 6. As shown in Fig. 2, said gun mounting may include a supporting member or rest 10 and a yoke 11, the yoke 11 being adapted to partially encircle the handlebar 6 and being suitably connected to the supporting member 10 so as to grip the handlebar 6 and hold the supporting means 10 in fixed position with respect to the handlebars. Any other suitable means of connecting the mount to the handlebars may be employed. An arm or post 12 may extend upwardly from the rest 10. As shown, the arm 12 is provided with a threaded stud 13 adapted to receive a nut 14, the stud passing through suitable openings in the rest 10 and yoke 11 so as to simultaneously hold the yoke and rest in position and at the same time support the arm 12. The upper end of the arm 12 terminates in a cylindrical portion 15 provided with a horizontal bore adapted to receive a pivot pin 16.

The holder 17 is pivotally mounted upon the pivot pin 16. The holder 17 may comprise spaced side members 18 and 19. These side members 18 and 19 may be held in spaced relation in any suitable manner. As shown in Fig. 4, the two members may be integral at the outer end of the holder 17, being connected to each other by means of a bottom portion 20. The holder 17 is also provided with a front stop 21. Such stop 21 may act as a spacing and connecting means, holding the side members 18 and 19 in proper relation. In general configuration, the holder 17 therefore resembles a channel with an open top. The pin 16 may be a bolt passing through the side members 18 and 19 and provided with a suitable lock nut 23. The pivot pin or body of the bolt 16 may carry sleeves or collars 24 and 25, said sleeves or collars 24 and 25 being yieldably urged towards the boss 15 carried by the upper end of the arm 12 as by means of spring washers 26 and 27. The boss 15 may be provided with two horizontally disposed radial beads 28 and 29, said beads being adapted to cooperate with complementary grooves in the collars 24 and 25. The collars 24 and 25 are preferably spot-welded to the washers 26 and 27 respectively and said washers are spot-welded to the side members 18 and 19 so that the collars 24 and 25 rotate around the pivot pin 16 with the holder 17. The collars 24 and 25 are, however, longitudinally movable along the pin 16. For this reason, when the holder 17 is partially rotated on the pivot pin 16 and the beads 28 and 29, formed in the boss 15, enter the corresponding grooves in collars 24 and 25, the holder 17 is snapped and held in position. Preferably, the beads and grooves are so arranged that the holder 17 is held in a substantially horizontal position with respect to the motorcycle.

The holder 17 is also provided with a rear stop. Said rear stop is preferably yieldably rotated towards the front stop 21. A stop of this nature is indicated in Figs. 3 and 4 and comprises a U-shaped member 30 yieldably attached to the holder 17 and particularly to a partial partition, by means of pins 33 carried by the rear stop member 30 and extending through suitable apertures in the rear partition 31. Springs 34 are carried by the pins 33 between the rear stop 30 and the partition 31, thus yieldably urging the rear stop 30 towards the front stop 21.

The two stops 21 and 30 are spaced a distance sufficient to permit the introduction of the ejector actuating means of a magazine gun. As shown in Fig. 3, the stops 21 and 30 hold the loading and ejecting means 35 of a sawed-off shotgun 36 which is introduced into the holder 17 and retained in such holder in any suitable manner as, for example, by means of a flexible cover 37 encircling the holder 17 and releasably attached to said holder as by means of the snap fasteners 38. The grip 39 of the gun 36 extends rearwardly towards the operator or driver of the motorcycle.

The rest 10 is suitably connected to the front fork of the motorcycle and may be provided with a spring latch means 40 adapted to cooperate with a groove or indentation 41 carried by the holder 17. In normal position, therefore, the gun 36 points downwardly as indicated at 36' (Fig. 1), the latch means 40 cooperating with the indentation 41 and maintaining the holder in such lowered position. When it is desired to employ the gun, the operator may by manipulating the stock 39, cause the holder 17 to pivot on the horizontal pin 16. When a substantially horizontal position is reached, the means for selectively holding the holder in a substantially horizontal position (including the beads 28 and 29 and corresponding grooves carried by the collars 24 and 25) are actuated, thereby maintaining the gun in the position indicated in full lines in Fig. 1. The loading of the gun if it be of the magazine type, is accomplished by moving the gun longitudinally in its holder 17, the loading means 35 being gripped by the holder between the stops 21 and 30. The ejection of shells is accomplished by a similar longitudinal movement of the gun within the holder.

It is to be noted that the gun 35 is therefore mounted as an integral part of the handlebars and front fork of the motorcycle and is provided with means for varying the elevation of the gun in a plane paralleling the longitudinal axis of the motorcycle. It has been found that even though the longitudinal axis of the gun and gun mounting is 3 to 6 inches away from the longitudinal axis of the motorcycle, it is possible to fire the gun while the motorcycle is running at high speed without having the recoil of the gun throw the front wheel of the motorcycle off its course and out of position. The yieldably urged rear stop 30 appears to absorb some of the recoil.

The rest 10 may be provided with a rearwardly extending portion 40 having an aperture 41 therein, said aperture being adapted to receive the trigger and trigger guard 42 of the gun when the muzzle of the gun is elevated. A padlock, indicated in dotted lines in Fig. 3, may then be placed through the trigger guard back of the trigger when the gun is in such elevated position, locking the gun to the tail piece 40 and preventing accidental discharge of the weapon. The gun in locked position is indicated in Fig. 1 at 36″.

It is therefore evident that this invention provides a motorcycle provided with a body portion and a front fork pivoted in the longitudinal axis of the body portion, and a gun mount and holder connected to the fork and handlebars, the gun holder being capable of moving integrally with the handlebars. Means have been provided for varying the elevation of the gun in a vertical plane paralleling the longitudinal axis of the motorcycle. Novel means have been provided for operating the reloading mechanism of the gun, such means comprising the front and rear stops 21 and 30 which hold the ejector means 35 of a gun 36. In actual operation, a motorcycle officer may have all of the controls for operating the motorcycle placed in the left-hand grip of the handlebars, thereby permitting him to control the motorcycle with his left hand while operating the gun with the right. Reloading of the gun is accomplished merely by moving the gun longitudinally in its holder 17. Aiming of the gun is facilitated by reason of the fact that the gun is always in substantial alignment with the axis of the motorcycle, or at least it is directed in a plane paralleling the longitudinal axis of the motorcycle.

Furthermore, means have been provided whereby when necessary the operator may quickly detach the gun from its holder. If, for example, the officer has occasion to leave his motorcycle, he may quickly rip the cover 37 off the holder by detaching the snap fasteners 38, thus permitting him to withdraw the gun 36 from the holder for hand use.

Those skilled in the art will readily conceive of numerous changes and modifications which could be made in the gun mount described hereinabove. The means for attaching the mount to the handlebars or front fork of the motorcycle, may be greatly varied. Fig. 7 illustrates a modified form of gun mount. As there shown, the rest 10, the holder 17 and the arm 12 are attached to an angular bracket 50 carried by the handlebars or front fork of a motorcycle such as, for example, the customary lamp bracket. The means of attachment illustrated in Fig. 7 include a bracket 51 fastened onto the member 50. More elaborate means for selectively holding the holder 17 in desired positions may be provided.

All such changes and modifications as come within the scope of the appended claims are embraced thereby.

I claim:

1. In a motorcycle provided with a body portion, a front fork pivoted in the longitudinal axis of the body portion and handlebars connected to said fork, the combination of a gun mount attached to said handlebars and provided with a trough-shaped holder mounted with its open side upwardly on a horizontal pivot, said holder being adapted to receive and support a gun, and means for releasably retaining a gun in said holder.

2. In a motorcycle provided with a body portion, a front fork pivoted in the longitudinal axis of the body portion and handlebars connected to said fork, the combination of a gun mount attached to said handlebars and provided with a trough-shaped holder mounted with its open side upwardly on a horizontal pivot, said holder being adapted to receive and support a gun, means for engaging with and preventing the longitudinal movement of a magazine gun placed in said holder, and means for selectively holding said holder in a desired position on said horizontal pivot.

3. In a motorcycle provided with a body portion, a front fork pivoted in the longitudinal axis of the body portion and handlebars connected to said fork, the combination of a gun mount attached to said fork and handlebars and adapted to move integrally therewith, said gun mount including a horizontal pivot, and a gun holder pivotally mounted on said pivot, said holder including means adapted to receive and yieldingly hold reloading mechanism of a gun whereby a gun in said holder may be reloaded from its magazine by longitudinal movement of the gun in said holder.

4. In a motorcycle provided with a body portion, a front fork pivoted in the longitudinal axis of the body portion and handlebars connected to said fork, the combination of a gun mount attached to said fork and handlebars and adapted to move integrally therewith, said gun mount including a horizontal pivot, a gun holder pivotally mounted on said pivot, said holder including means adapted to receive and yieldingly hold reloading mechanism of a gun whereby a gun in said holder may be reloaded from its magazine by longitudinal movement of the gun in said holder, and means for releasably retaining the gun in said holder.

5. In a motorcycle provided with a body portion, a front fork pivoted in the longitudinal axis of the body portion and handlebars connected to said fork, the combination of a gun mount attached to said fork and handlebars to move integrally therewith, said gun mount being provided with a horizontal pivot and a downwardly inclined rest below said horizontal pivot, a gun holder pivotally connected to said pivot, means for releasably locking a gun in said holder, and means for releasably locking the holder on said rest.

6. In a motorcycle provided with a body portion, a front fork pivoted in the longitudinal axis of the body portion and handlebars connected to said fork, the combination of a gun mount connected to said fork and adapted to move integrally therewith, said gun mount being spaced from the longitudinal axis of the body and fork and provided with a horizontal pivot substantially transverse to the longitudinal axis of the body and fork, a holder pivotally connected to said pivot and adapted to receive and support a gun, means for releasably locking a gun in said holder, and means for selectively holding said holder in a desired position on said horizontal pivot.

7. A gun mount for vehicles comprising, a horizontal pivot member, a gun holder including spaced side members pivotally connected to said horizontal pivot and extending forwardly thereof, and a front stop member and a rear stop member carried by said side members, said rear stop member being provided with spring means adapted to yieldably urge the rear member toward the front stop member so as to grip the loading mechanism of a magazine gun whereby a gun in said holder may be reloaded from its magazine by longitudinal movement of the gun in said holder.

8. A gun mount for vehicles comprising, a gun holder including spaced side members pivotally connected to a vehicle, means carried by the side members and adapted to receive and hold a magazine gun placed therebetween, and a front stop member and a rear stop member carried by and between said side members and adapted to grip the ends of the loading mechanism of a magazine gun in said holder whereby a gun in said holder may be reloaded from its magazine by longitudinal movement of the gun in said holder.

9. A gun mount for vehicles comprising, a gun holder including spaced side members pivotally connected to a vehicle, means for releasably locking a gun between said spaced side members of said holder, opposing front and rear stop members carried by and between said side members and adapted to grip the ends of the loading mechanism of a magazine gun in said holder whereby a gun in said holder may be reloaded from its magazine by longitudinal movement of the gun in said holder, a downwardly inclined rest below said holder, and means for releasably locking the holder on said rest.

10. A gun mount for vehicles comprising, a holder including a substantially trough-shaped member with its open side directed upwardly pivotally connected to a vehicle, means for releasably locking a magazine gun in said trough member, a front stop member and a rear stop member carried by said trough-shaped member, said rear stop member being provided with spring means adapted to yieldably urge the rear member toward the front stop member and to hold the loading mechanism of a magazine gun in said holder whereby a gun in said holder may be reloaded from its magazine by longitudinal movement of the gun in said holder.

Signed at San Gabriel, Cal., this 10th day of December, 1931.

ARTHUR E. MANZER.